UNITED STATES PATENT OFFICE.

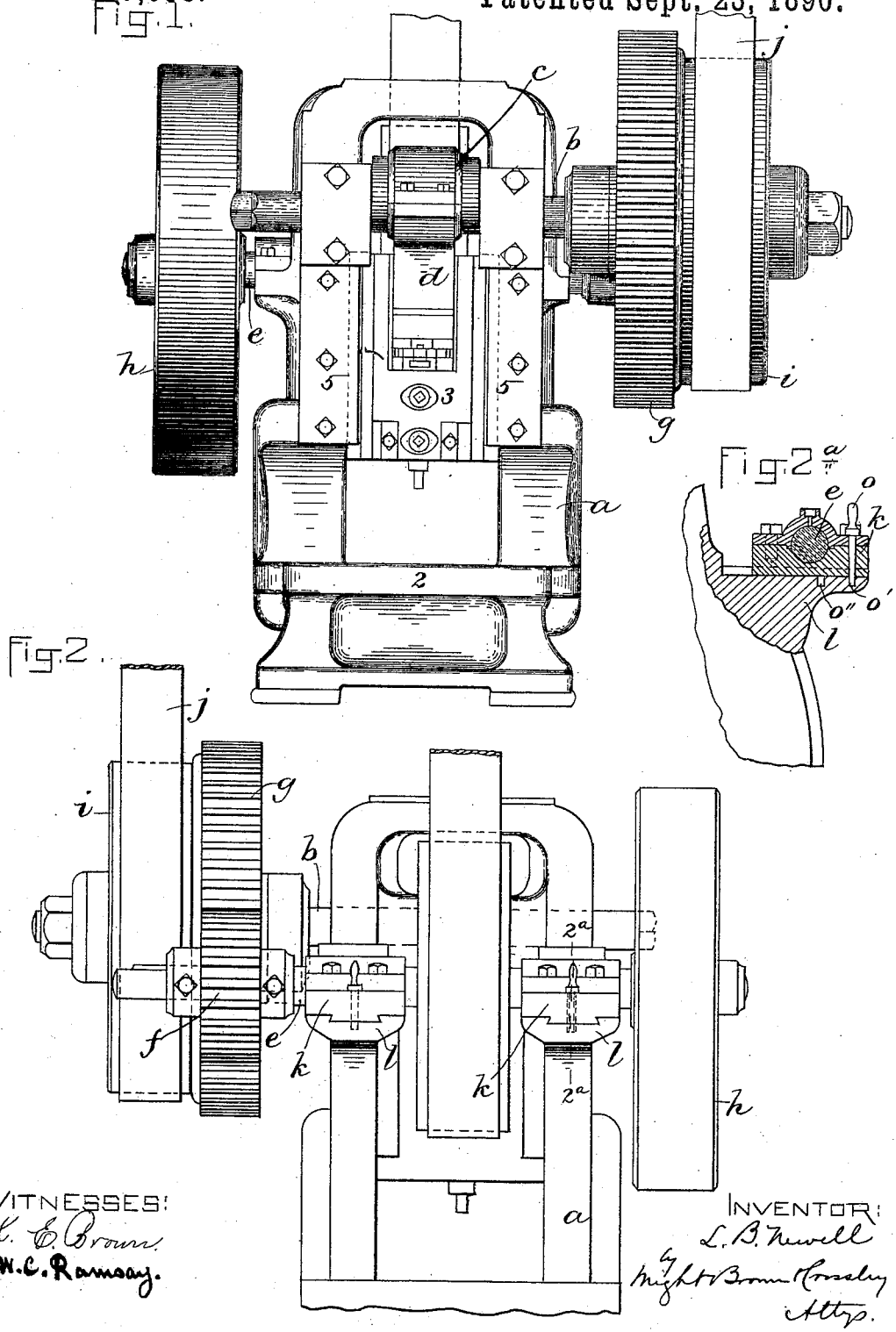

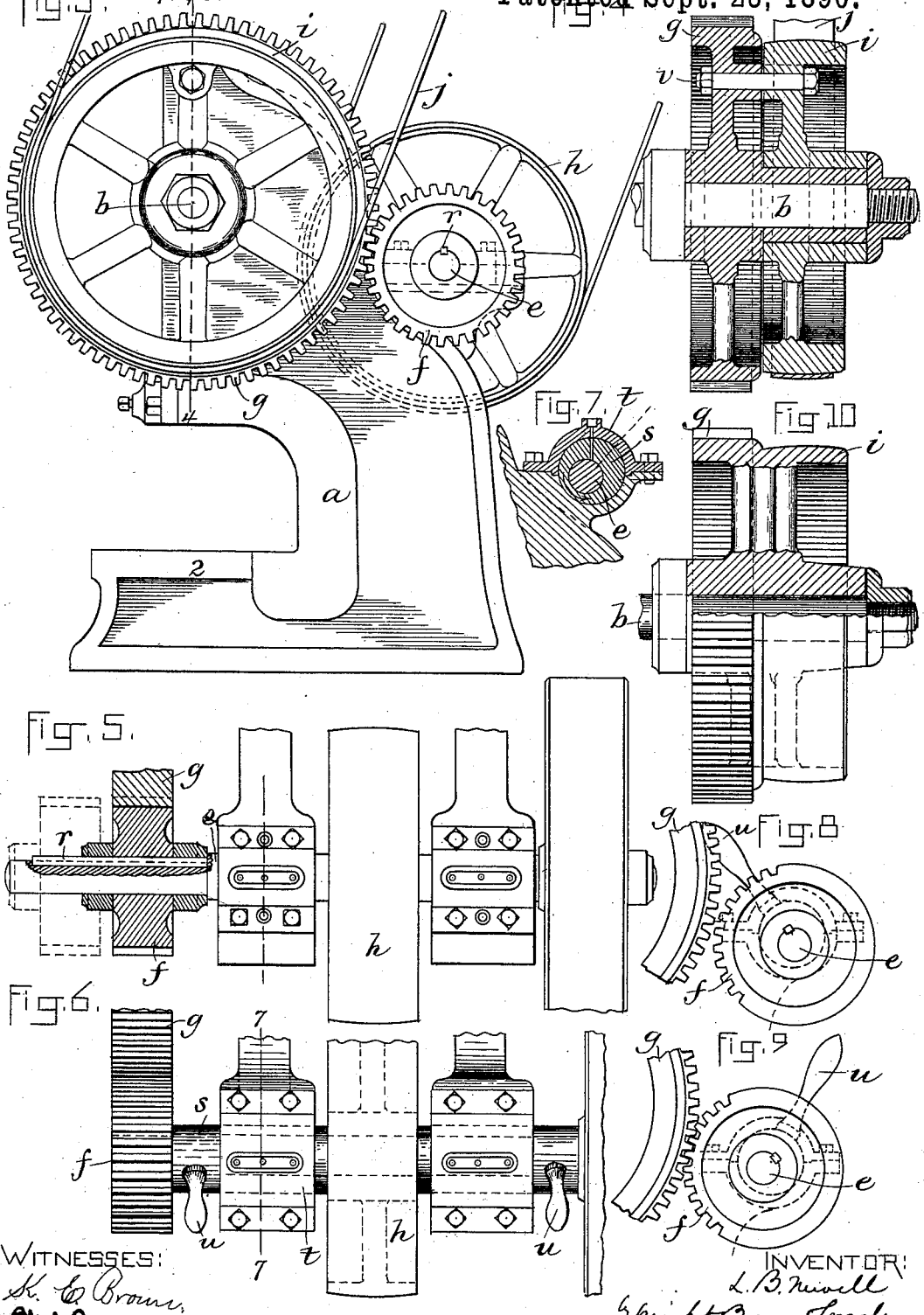

LORENZO B. NEWELL, OF NEWTON CENTRE, MASSACHUSETTS.

POWER-PRESS.

SPECIFICATION forming part of Letters Patent No. 437,038, dated September 23, 1890.

Application filed January 11, 1890. Serial No. 336,635. (No model.)

*To all whom it may concern:*

Be it known that I, LORENZO B. NEWELL, of Newton Centre, in the county of Middlesex and State of Massachusetts, have invented certain new and useful Improvements in Power-Presses, of which the following is a specification.

This invention relates to power-presses in which the shaft having the crank or eccentric that operates the cross-head carrying the movable die of the press is geared to a counter-shaft, otherwise termed in power-presses a "pinion-shaft," journaled in bearings on the frame of the machine and driven by a connection with a driving-shaft, said pinion-shaft imparting motion to the die-operating shaft through a small gear or pinion on the pinion-shaft and a larger gear on the die-operating shaft, so that the maximum power is imparted to the cross-head and the movable die carried thereby at the expense of speed, the die being necessarily moved at a comparatively slow rate.

A press organized as above indicated is necessary where considerable power is required to do comparatively heavy work, but it is objectionable for light work on account of the slowness of operation. It is therefore usual in manufacturing establishments using power-presses to employ two machines—one organized to operate slowly and with maximum power, its operating-shaft being geared to a pinion-shaft, as above described, while the other is adapted to operate more rapidly at the expense of power, its die-operating shaft being connected by a belt directly to the driving-shaft without the intervention of the pinion-shaft and gearing. There are, however, many small establishments where the employment of two power-presses is impracticable on account of the lack of floor-space, while many manufacturers cannot afford the expense of two presses.

My invention has for its object to meet the requirements of such establishments by enabling one press to be operated either through a pinion-shaft geared to the die-operating shaft or by a direct connection of the die-operating shaft with the driving-shaft without the intervention of the pinion-shaft, so that the press can be either operated with the maximum power at the expense of speed or more rapidly at the expense of power.

To this end the invention consists in the combination, with a power-press having a die-operating shaft arranged in the usual or any suitable manner to operate the die-carrying cross-head, and a pinion-shaft geared to said die-operating shaft and adapted to receive motion from a driving-shaft, of a pulley on the die-operating shaft adapted to support a driving-belt, and means for detachably connecting the die-operating shaft with the pinion-shaft, the arrangement being such that the die-operating shaft can be disconnected from the pinion-shaft and belted directly to the driving-shaft when the maximum speed is desired, and connected with the pinion-shaft and driven through the gearing when the maximum power is desired.

The invention also consists in certain details relating to the means for detachably connecting the die-operating shaft to the pinion-shaft, all of which I will now proceed to describe and claim.

Of the accompanying drawings, forming a part of this specification, Figure 1 represents a front elevation of a power-press embodying my improvements. Fig. 2 represents a rear elevation of the same. Fig. 2ª represents a section on line 2ª 2ª, Fig. 2. Fig. 3 represents a side elevation. Fig. 4 represents a section on line 4 4, Fig. 3. Fig. 5 represents a top plan view of the pinion-shaft and one means for detachably connecting it to the die-operating shaft. Fig. 6 represents a similar view showing a different means for the same purpose. Fig. 7 represents a section on line 7 7, Fig. 6. Figs. 8 and 9 represent end views of the construction shown in Fig. 6. Fig. 10 represents another modification.

The same letters of reference indicate the same parts in all of the figures.

In the drawings, *a* represents the supporting-frame of a power-press, said frame having the bed 2, which supports the fixed die and the guides 5 5, between which is the cross-head 3 that carries the movable die.

*b* represents the die-operating shaft, which is journaled in bearings on the frame *a*, and is provided with a crank or eccentric *c*, which is connected by a link *d* with the cross-head 3.

The parts above referred to are of the usual or any suitable construction, and in themselves form no part of my invention.

*e* represents the pinion-shaft, which is journaled in bearings on the frame *a*, and is provided with a small gear or pinion *f*, which meshes with the larger gear $g$ on the die-operating shaft $b$, the pinion-shaft having a pulley $h$, which is belted to the driving-shaft, so that power may be imparted from the driving-shaft through the pinion-shaft $e$ and gears $f g$, as usual in power-presses of this class.

In carrying out my invention I provide means whereby the shaft $b$ may be readily disconnected from the pinion-shaft, so that it may rotate independently of the latter, and combine with the said shaft $b$ a pulley $i$, which is adapted to be belted directly to the driving-shaft, so that the shaft $b$ may be driven directly from said shaft through the medium of the belt $j$ instead of through the pinion-shaft $e$ and gears $f g$.

The means for disconnecting the die-operating shaft $b$ from the pinion-shaft $e$ may be variously modified.

In Figs. 2 and $2^a$ I show the pinion-shaft journaled in boxes $k\ k$, which are fitted to slide on dovetail guides $l\ l$ on the frame $a$, said guides being arranged so that the movement of the boxes $k\ k$ on them in one direction will move the pinion-shaft $e$ away from the shaft $b$, and thus separate the gear $f$ from the gear $g$. The boxes may be secured to the guides $l$ in either of two positions by means of bolts $o\ o$ entering holes $o'\ o''$ in the guides, as shown in Fig. $2^a$.

When the operator desires to disconnect the shafts $b\ e$, he withdraws the bolts $o$ from the holes $o''$ and moves the boxes $k$ backwardly to the position shown in Fig. $2^a$ and secures them by forcing the bolts into the holes $o'$. The die-operating shaft is thus adapted to be driven by the belt $j$, entirely independently of the shaft.

In Figs. 3 and 5 I show the pinion or gear $f$, movable lengthwise on the pinion-shaft $e$ and engaged therewith by a feather $r$ on the shaft, so that the said pinion or gear may be engaged with the gear $g$, as shown in full lines in Fig. 5, or moved out of engagement with said gear, as shown in dotted lines.

In Figs. 6, 7, 8, and 9 I show the shaft $e$ mounted eccentrically in a cylindrical bearing $s$, which is fitted to rotate in fixed bearings $t\ t$, and is provided with handles $u$, whereby it may be partially rotated. When the bearing $s$ is turned to one position, it throws the shaft $e$ away from the shaft $b$ and separates the gears $f g$, as shown in Fig. 8, and when said bearing is turned to another position the shaft $e$ is moved toward the shaft $b$, and the gears $f g$ are connected, as shown in Fig. 9.

It is obvious that various other means for the engagement of the pinion-shaft with and its disengagement from the die-operating shaft may be adopted without departing from the spirit of my invention. The pulley $i$ may be detachably secured to the gear $g$ by a bolt $v$, as shown in Fig. 4, or it may be formed integral with said gear, as shown in Fig. 10, or connected with the shaft $b$ in any other suitable way.

It is obvious that a disk or crank affixed to the shaft $b$ and having an eccentric wrist-pin connected by a connecting-rod with a crank on the driving-shaft would be a mechanical equivalent of the pulley $i$. Hence I do not confine myself strictly to said pulley, although it is the best mechanical appliance that can be used for the purpose.

I claim—

1. In a power-press, the combination, with the die-operating shaft, the pinion-shaft, and the gearing connecting said shafts, of a pulley or its equivalent on the die-operating shaft, and means for disconnecting the pinion-shaft from the die-operating shaft, whereby the die-operating shaft may be driven by a belt running on its pulley independently of the pinion-shaft, as set forth.

2. In a power-press, the combination of the die-operating shaft, a gear $g$, and a pulley $i$ or its equivalent on said shaft, the pinion-shaft and a pinion or gear thereon adapted to engage the gear $g$, said gear $f$ being movable toward and from the gear $g$, whereby said gear may be connected and disconnected, as set forth.

3. In a power-press, the combination of the die operating shaft, a gear $g$ and a pulley $i$ or its equivalent on said shaft, the pinion-shaft and a pinion or gear thereon adapted to engage the gear $g$, and means, substantially as described, whereby the gear $f$ may be moved into and out of engagement with the gear $g$, as set forth.

4. In a power-press, the combination of the die-operating shaft, a gear $g$ and a pulley $i$ or its equivalent on said shaft, the pinion-shaft and a pinion or gear thereon adapted to engage the gear $g$, and a movable support or supports for the shaft $e$, whereby the latter may be moved to engage the gear $f$ with or disengage it from the gear $g$, as set forth.

5. In a power-press, the combination of the die-operating shaft, a gear $g$ and a pulley $i$ or its equivalent on said shaft, the pinion-shaft and a pinion or gear thereon adapted to engage the gear $g$, the movable boxes $k\ k$, supporting the shaft $e$, and the fixed guides $l\ l$ for said boxes, as set forth.

6. The improved power-press composed of a supporting-frame having the usual fixed and movable dies, a die-carrying cross-head, an operating-shaft $b$ for said cross-head, provided with a gear $g$ and a pulley $i$ or its equivalent, the pinion-shaft $e$, having a pinion or gear $f$, adapted to engage the gear $g$, said pinion or gear $f$ being movable toward and from the gear $g$, as set forth.

In testimony whereof I have signed my name to this specification, in the presence of two subscribing witnesses, this 7th day of January, A. D. 1890.

LORENZO B. NEWELL.

Witnesses:
C. F. BROWN,
W. C. RAMSAY.